(12) United States Patent
Heath et al.

(10) Patent No.: US 7,706,626 B2
(45) Date of Patent: Apr. 27, 2010

(54) DIGITAL IMAGE RECONSTRUCTION USING INVERSE SPATIAL FILTERING

(75) Inventors: Michael D. Heath, Rochester, NY (US); Edward B. Gindele, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 1150 days.

(21) Appl. No.: 11/312,142

(22) Filed: Dec. 20, 2005

(65) Prior Publication Data

US 2007/0140580 A1 Jun. 21, 2007

(51) Int. Cl.
G06K 9/40 (2006.01)
H04N 5/00 (2006.01)

(52) U.S. Cl. .................... 382/263; 348/606

(58) Field of Classification Search ........... 382/166, 382/167, 232–233, 254, 260, 305, 309, 312, 382/263, 266; 358/1.15, 518; 709/201, 204, 709/213, 217; 345/2.2, 581; 355/40; 348/606
See application file for complete search history.

(56) References Cited

U.S. PATENT DOCUMENTS

| | | | |
|---|---|---|---|
| 5,541,028 A | 7/1996 | Lee et al. | |
| 5,799,100 A | 8/1998 | Clarke et al. | |
| 5,978,518 A | 11/1999 | Oliyide et al. | |
| 6,069,979 A | 5/2000 | VanMetter | |
| 6,301,393 B1 * | 10/2001 | Spaulding et al. | 382/240 |
| 6,323,869 B1 | 11/2001 | Kohm et al. | |
| 6,351,571 B1 | 2/2002 | VanMetter et al. | |
| 6,775,407 B1 * | 8/2004 | Gindele et al. | 382/166 |
| 7,113,649 B2 * | 9/2006 | Gindele | 382/274 |
| 7,158,686 B2 * | 1/2007 | Gindele | 382/274 |
| 2004/0061889 A1 | 4/2004 | Wood et al. | |
| 2005/0018894 A1 | 1/2005 | Couwenhoven et al. | |

FOREIGN PATENT DOCUMENTS

EP   0 577 363 A1   1/1994
EP   1 069 529 A2   1/2001

OTHER PUBLICATIONS

DICOM Standard (Digital Imaging and Communications in Medicine PS Mar. 3, 1999, National Electrical Manufacturers Association-1999 (text book).

* cited by examiner

Primary Examiner—Kanji Patel

(57) ABSTRACT

A method for processing a source digital image wherein the source digital image is comprised of a plurality of pixels. A spatial filter is applied to the source digital image to produce an enhanced digital image. An inverse spatial filter is applied to the enhanced digital image to produce an estimated digital image. A difference digital image is then produced from the estimated digital image and the source digital image, wherein the difference digital image is representative of a difference between the source digital image and the estimated digital image. The difference digital image and the enhanced digital image can be transmitted from a first device to a second device remote. At the second device, a reconstructed digital image can be generated from the difference digital image and the enhanced digital image, wherein the reconstructed digital image is substantially equivalent to the source digital image.

20 Claims, 9 Drawing Sheets

DIGITAL IMAGE RECONSTRUCTION USING INVERSE SPATIAL FILTERING

FIELD OF THE INVENTION

The present invention relates to the field of digital imaging, and more particularly, to processing a digital image using a difference digital image to reconstruct an original image.

BACKGROUND OF THE INVENTION

Information technology is having an important influence on medical imaging. Picture archiving and communications systems (PACS) allow for digital acquisition, image processing and display for a variety of medical imaging modalities in a digital, filmless environment. The advantages promised by digital medical imaging include increased productivity for health care professionals who utilize images and increased flexibility in how medical images are used to improve patient care.

One source of medical images is the detection of x-rays projected through a region of interest in a patient so as to measure the x-ray transmittance with an imaging detector of finite area. Such images are generally referred to as projection radiographic images. After acquisition, the images can be enhanced using digital image processing techniques to maximize the display of diagnostic information in the image. Successful automatic application of the processing, on the capture modality, provides images that are ready for display and serves to increase the productivity of health care professionals as images can be viewed on computer displays or printed for viewing on a light box.

In conventional film-screen radiographs, the visual presentation of radiographs is locked at the time of capture and chemically processed. Unlike conventional film-screen radiographs, digital radiographs may be selectively enhanced after acquisition to provide different appearances. Particular attributes of the image (such as the brightness, latitude, detail contrast, sharpness and the appearance of the noise) can be modified/enhanced. Additionally, computer aided analysis of the image may be performed, such as the computer aided detection (CAD) of lesions in digital mammograms. With multiple uses for medical images, there exists a need to store, retrieve and transmit both enhanced and un-enhanced images. Preferably, such storage, retrieval and transmittal can occur within a PACS system to meet the requirements of all devices in the PACS.

In an open systems environment, such as DICOM (Digital Imaging Communications in Medicine), there are provisions for support of both enhanced and original, or un-enhanced medical images. In particular, the DICOM standard (Digital Imaging and Communications in Medicine PS 3.3-1999, National Electrical Manufacturers Association, 1999) addresses the management of image data which is either enhanced or un-enhanced. The concept is presented in the DX Series Module by the introduction of Presentation Intent Type. This tag may have the value of FOR PRESENTATION or FOR PROCESSING. If the value of the tag is FOR PRESENTATION, the image has been enhanced such that the image may be displayed without additional processing required. If the value of the tag is FOR PROCESSING, the image must undergo additional enhancement processing prior to display and interpretation. The intent of FOR PROCESSING image data is to allow computer-aided-detection processing and to allow more capable systems, which can perform the required enhancement processing, to do so while still using a DICOM image object while also preserving the capability to provide image data that is display-ready by the use of FOR PRESENTATION.

While the DICOM standard provides representations for both enhanced and un-enhanced versions of an image, it does not provide an efficient means to archive and/or transmit images in both un-enhanced and enhanced states. Handling both enhanced and un-enhanced images using the DX series module in DICOM thus adds both complexity and additional image archive storage requirements to a PACS system to manage requests for different versions of the same image.

U.S. Pat. No. 6,301,393 (Spaulding), issued Oct. 9, 2001, relates to representing an image in more than one image processing state using the concept of a delta image to represent the difference between two images. The method disclosed by Spaulding allows a remote user to reconstruct an original un-enhanced image from the combination of an enhanced image and delta image. However, the method of reconstruction disclosed does not account for the delta image file size dependence on spatial filtering operations that may have been applied to generate the enhanced image. As such, the method disclosed by Spaulding is not particularly suited for imaging applications that rely on spatial filtering operations for image enhancement, for example, medical imaging applications.

Accordingly, there exits a need for a method that allows a user to selectively display an enhanced digital image or reprocess an original digital image so that any lost information can be viewed without having to retrieve the large original digital image.

SUMMARY OF THE INVENTION

An object of the present invention is to efficiently transmit an arbitrarily modified digital image to a processing site.

Another object of the present invention is to provide a method that allows a user to selectively display an enhanced digital image or reprocess an original digital image so that any lost information can be viewed without retrieving the original digital image.

Another object of the present invention is to provide such a method which is suited for medical imaging applications.

Any objects provided are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for processing a digital image. The method includes the steps of: accessing the source digital image comprised of a plurality of pixels; applying a spatial filter to the source digital image to produce an enhanced digital image; applying an inverse spatial filter to the enhanced digital image to produce an estimated digital image; and producing a difference digital image from the estimated digital image and the source digital image, the difference digital image being representative of a difference between the source digital image and the estimated digital image.

The difference digital image and the enhanced digital image can be transmitted from a first device to a second device remote. At the second device, a reconstructed digital image can be generated from the difference digital image and the enhanced digital image, wherein the reconstructed digital image is substantially equivalent to the source digital image.

With the present invention, a source digital image is reconstructed from enhanced and difference digital images, with the enhanced digital image having been generated from a source digital image by spatial filter processing.

An advantage of the present invention is that the difference digital image representing the difference between a source digital image and a reconstructed digital image can be used in conjunction with arbitrary image enhancement algorithms. Still further, the enhanced and source digital images can be transmitted throughout a network without risk of improper display by a less capable system. The efficient representation of the enhanced and source digital images offers a reduction in archive storage and communications bandwidth over separate representation of the enhanced and source digital images.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
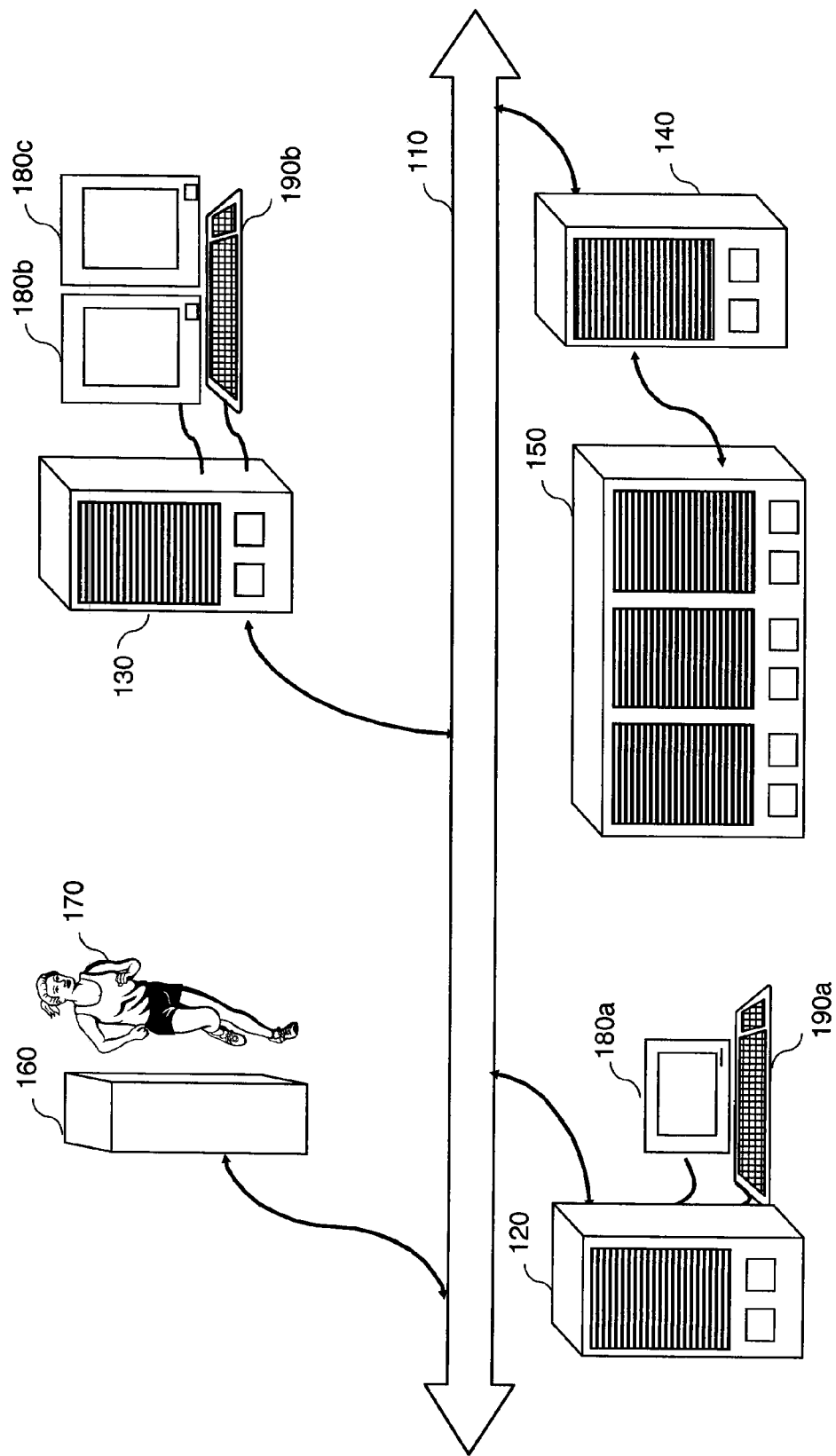
FIG. 1 is a diagrammatic view showing a medical imaging communications network of connected computers suitable for practicing the present invention.

The following is a detailed description of the preferred embodiments of the invention, reference being made to the drawings in which the same reference numerals identify the same elements of structure in each of the several figures.

Medical imaging applications can be implemented by means of a picture archiving and communications systems (PACS). These well-known systems provide a means for displaying digital images acquired by a wide variety of medical imaging modalities such as projection radiography (x-ray images), computed tomography (CT images), ultrasound (US images), and magnetic resonance (MR images). Typically the acquired image pixel data represents a range of sensed intensities.

The acquired medical digital images can be viewed directly on an electronic display. However, most medical digital images are enhanced. That is, the original digital image's pixel data are processed with image enhancement software to produce a rendered digital image. The rendered digital image, when viewed directly on an electronic display, yields an improvement in diagnostically relevant information for trained observers when compared to viewing the original digital image composed of acquired image pixel data.

Although the rendered digital image, in general, yields better diagnostic results, the original digital image can contain some mathematical information that has been lost in the rendering process. For some medical imaging applications, and for some particular medical images, it can be advantageous to reprocess the original digital image after an initial viewing of the rendered, or enhanced digital image. This reprocessing is typically done in a targeted manner to emphasize a particular image feature or region of interest. Therefore, there is value in having both the original (i.e., un-enhanced) and enhanced digital images available to a medical observer.

It is possible in a PACS to transmit both the original and enhanced digital images from the point of origin. However, sending both images essentially doubles the amount of data required to transmit over a network. Since network bandwidth is often limited, sending both the original and enhanced digital images can be costly.

U.S. Pat. No. 6,301,393 (Spaulding) disclosed a method of representing a digital image in more than one image processing state. The method disclosed by Spaulding can be used to encode an enhanced digital image with a difference digital image, wherein the difference digital image represents the mathematical information contained in the original digital but not in the enhanced digital image. The received enhanced digital image is used to generate an estimated digital image and the extra mathematical information is encoded in a difference digital image. The estimated digital image is then combined with the difference digital image to reconstruct the original digital image. While the method disclosed by Spaulding does allow a remote user to reconstruct an original digital image, the method of reconstruction disclosed by Spaulding does not account for the delta image file size dependence on spatial filtering operations that may have been applied to generate the enhanced image. In general, spatial filtering operations, and spatial sharpening operations in particular, represent a significant part of the image enhancement processing applied to produce enhanced digital images. Therefore, while Spaulding's method has achieved certain degrees of success in its particular applications, it is not particularly suited for certain imaging applications due to the large size of the resulting difference digital image.

It is desirable to reduce the size of the difference digital image in conjunction with significant applied enhancement spatial filtering operations. The present invention discloses a method for reducing the amount of memory required to represent the difference digital image that relies on the application of either an inverse spatial filtering operation or a spatial filtering estimation operation. The details of the added spatial filtering operations will be described in more detail below.

In the following description, an embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

For the purposes of clarification, a digital image can include one or more digital image channels wherein each digital image channel includes a two-dimensional array of pixels. Each pixel value relates to the amount of light received by an image capture device corresponding to the geometrical domain of the pixel. For color imaging applications a digital image will typically consist of red, green, and blue digital image channels. Other configurations are also practiced, e.g. cyan, magenta, and yellow digital image channels. Motion imaging applications can be thought of as a time sequence of digital images. For radiographic digital images, the pixel data is most typically represented as just a single monochrome digital image channel or two-dimensional array of pixels. Those skilled in the art will recognize that the present invention can be applied to, but is not limited to, a digital image channel for any of the above mentioned applications. Although the present invention describes a digital image channel as a two dimensional array of pixel values arranged by rows and columns, those skilled in the art will recognize that the methodology of the present invention can be applied to mosaic (non rectilinear) arrays with equal effect.

Although the present invention is described with reference to medical digital imaging application, those skilled in the art will recognize that the present invention can be practiced with non-medical digital imaging applications. For example, most medical digital images represent monochrome images, e.g., x-ray images do not typically convey color information. However, the present invention can be applied to each color record of a digital color image.

Some medical images represent inherently three-dimensional image data, e.g., Computed Tomography (CT) and Magnetic Resonance (MR) images. The present invention can be practiced with these forms of three-dimensional digital images. A CT or MR digital image can be, and often is, organized as a series of slices wherein each slice is two-dimensional digital image. Therefore, the present invention can be practiced individually on the slices of a three-dimensional digital image.

The present invention may be implemented with multiple computers connected by means of a communications network. An exemplary medical imaging communications network (including multiple computers) is illustrated in FIG. 1. Such a network of connected computers provides a means of sending and receiving information between any two or more connected computers. A communications network 110 may include physical connections from one computer to another such as can be achieved with a conventional Ethernet communications network. It is also possible for the communications network to include non-physically connected communications lines such as can be achieved with microwave communications links, radio communications links, coaxial cable television communications links, fiber optic communication links, or cellular telephone communications links. Thus, the present invention may be practiced with any of the communications systems mentioned above, but is not limited solely to these systems since the present invention relies on exchange of information not the means of achieving the exchange of information.

An image-capable computer is any device capable of executing a series of computational instructions that includes the manipulation of digital image data. Although fundamentally any image-capable computer may have the capability to perform any computational instructions, the image-capable computers illustrated in FIG. 1 have been given specialized names to emphasize the special purpose functions they perform. Some examples of image-capable computers are an image processing computer 120, diagnostic workstation computer 130, image server computer 140, personal computer, mobile computer, kiosk computer, and the like. The present invention may be practiced with, but is not limited to, all of the above examples of image capable computers. It should also be considered that a given computer can be configured to perform more than one function illustrated in FIG. 1. However, for the purposes of discussion of the present invention, the specialized functions will be referred to as separate entities even though the physical implementation of the computer hardware may not always be separate.

The image server computer 140 shown in FIG. 1 refers to a specialized computer device that has been configured for the purposes of retrieving digital images from an image archive 150 for other computers connected to communications network 110. A function performed by image archive 150 is the facilitation of transfer or exchange of image information rather than the processing of information. Image archive 150 serves as a large storage repository of digital images and other medical information. The arrows in the diagram of FIG. 1 represent the exchange of information, which in general, is bi-directional i.e., the flow of information can be achieved in either direction. Since information can flow from computer to computer for the computers, a network of connected computers is formed.

Computers not shown in diagram of FIG. 1 might be connected symbolically by means of communications network 110. Thus, any computer connected to another computer which is connected to the communications network is also connected and can exchange information with any other computer connected to the network.

For the purposes of the discussion of the present invention the collection of inter-connected computers including the communications network will be also be referred to as a DICOM network since DICOM (Digital Imaging and Communications in Medicine PS 3.3-1999, National Electrical Manufacturers Association, 1999) formatted digital images is currently the most prevalent file encoding used for medical digital images.

Image processing computer 120 and diagnostic workstation computer 130 are shown connected to communications network 110. These computers have the capability for the exchange and display of information. In particular, as it relates to the present invention, these computers have the ability to, but are not limited to, the display of text, graphic, image information, and the like. Such a computer is typically connected to the DICOM network with software that understands a variety of protocols and manages the visual display of information.

Individual users of the medical imaging network may access the Internet with a connected personal computer. Personal computers may be portable units such as a laptop computer. If a personal computer is connected to communications network 110 with a wireless connection, it can be located almost anywhere. In such a configuration, diagnostic workstation computer 130 can represent a mobile computer, e.g., a laptop computer or a hand held computer device. Fundamentally, a mobile computer and personal computer may differ mostly in size and weight.

Still referring to FIG. 1, an image capture device 160 represents medical digital image modality devices such as, but not limited to, projection radiographic devices that produces x-ray digital images (e.g., computed radiography devices and digital radiography devices), a computed tomography device (CT) that produces 3-dimensional CT digital images, and/or a Magnetic Resonance imaging device (MR) that also produces 3-dimensional MR digital images. A patient 170 is imaged using image capture device 160 to generate a source digital image 201 (shown in FIG. 2) which is transmitted to image processing computer 120 through either a direct connection or through communications network 110.

An electronic display 180a and input control device 190a (e.g., a keyboard, mouse, or pointing device) are connected to image processing computer 120 and can be used for data entry and operator assistance.

Similarly, electronic displays 180b and 180c and input control device 190b (e.g., a keyboard, mouse, or pointing device) can be connected to diagnostic workstation computer 130 to be used for data entry and operator assistance.

Figure 2:
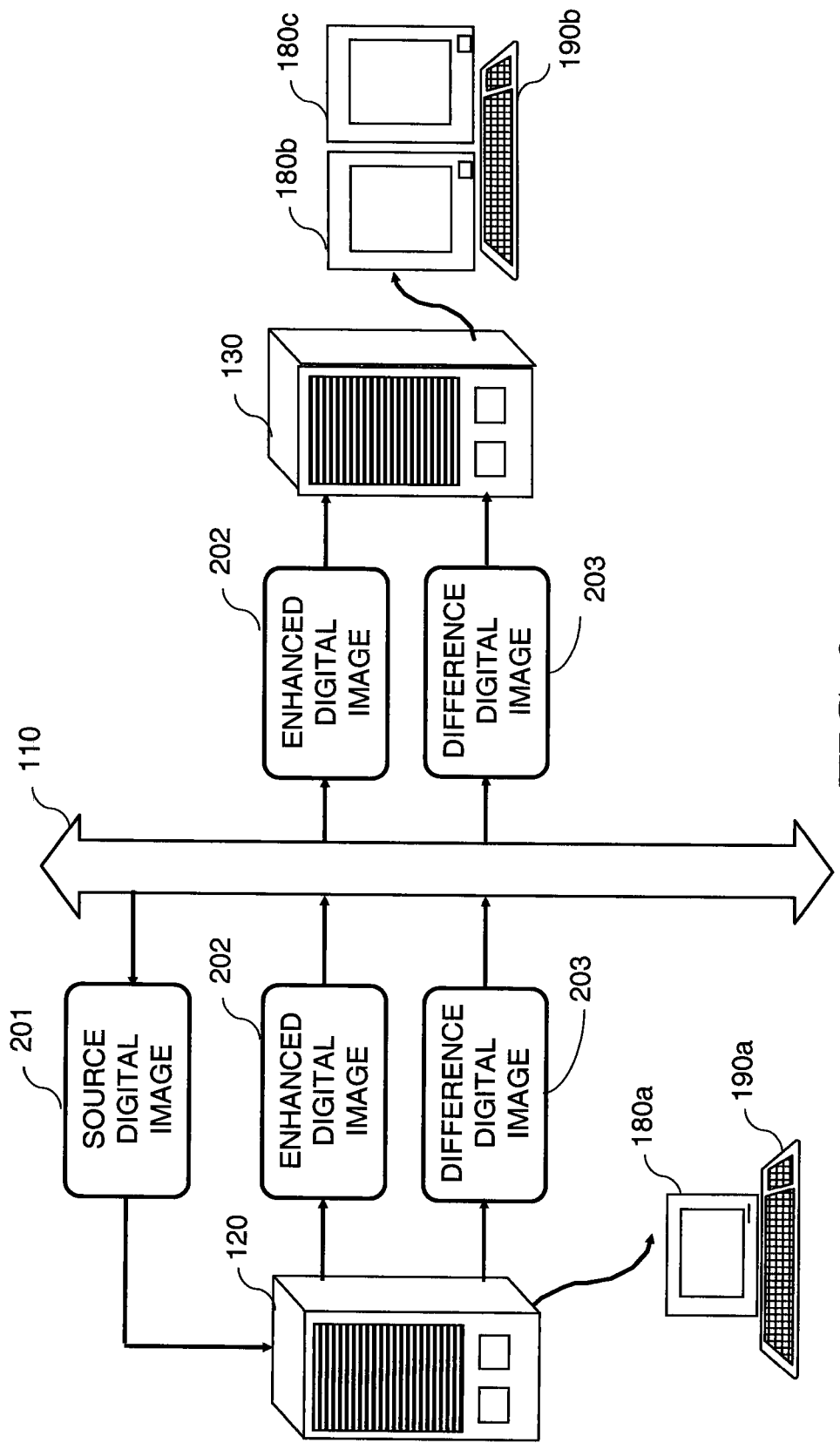
FIG. 2 is a diagrammatic view showing two network server computers connected by means of a communications network transferring digital images.

Referring now to FIG. 2, there is shown a diagrammatic view showing two network server computers connected by means of a communications network transferring digital images. Image processing computer 120 receives source digital image 201 from image capture device 160, and performs enhancement processing to generate an enhanced digital image 202 and a difference digital image 203. Typically, source digital image 201, when displayed directly with electronic display 180a, will not reveal all relevant diagnostic information to a trained observer such as a radiologist. Usually some form of enhancement processing is performed on source digital image 201 to improve the visibility of image detail before viewing on electronic display 180a.

It should be noted that no new information is actually encoded in enhanced digital image 202 by virtue of applying the enhancement algorithm technology. Rather, the opposite can occur. Enhanced digital image 202 contains an equal or less amount of mathematical information than source digital image 201. In effect, some mathematical information is lost in the transformation from source digital image 201 to enhanced digital image 202 in order to condition the image information so that radiologist, and other medical personnel, can see more image detail.

Together, enhancement digital image 202 and difference digital image 203 can be thought of as an alternative representation of the mathematical image information in source digital image 201. Image processing computer 120 transmits both enhancement digital image 202 and difference digital image 203 to diagnostic workstation computer 130 by means of communications network 110. Diagnostic workstation computer 130 can display enhanced digital image 202 directly on one of a multiplicity of electronic display devices shown in FIG. 2 as 180b and 180c. However, diagnostic workstation computer 130 can also process enhancement digital image 202 and difference digital image 203 to form a reconstructed digital image 205 (shown in FIG. 4) that is substantially equivalent or identical to source digital image 201. This is achieved without actually having received source digital image 201 directly.

There are several reasons why it is advantageous to have the image information in the form of enhanced digital image 202 and difference digital image 203 rather than as source digital image 201. Enhanced digital image 202 can be displayed directly on electronic display 180b, whereas doing so with source digital image 201 would yield visually inferior results.

Secondly, although source digital image 201 can be processed to produce another enhanced digital image 202, this processing can take time and thus for some applications it is more convenient to transmit enhanced digital image 202 directly.

applies enhancement processing designed to allow the radiologist to see the otherwise lost or missing image detail.

Thirdly, it is possible that after some viewing of enhanced digital image 201, that a radiologist would like to reprocess the original image information (i.e., source digital image 201) to render the missing or lost image information visible. The radiologist could request that source digital image 201 be sent by means of communications network 110. However, since difference digital image 203 requires less memory than source digital image 201, it will take less bandwidth from communications network 110 to send difference digital image 203. Therefore, difference digital image 203 need only be transmitted to diagnostic workstation computer 130 when a reprocessing of the image information is requested. Upon a request, diagnostic workstation computer 130 combines difference digital image 203 with enhanced digital image 202, generates reconstructed digital image 205, and applies enhancement processing designed to allow the radiologist to see the otherwise lost or missing image detail.

Figure 3:
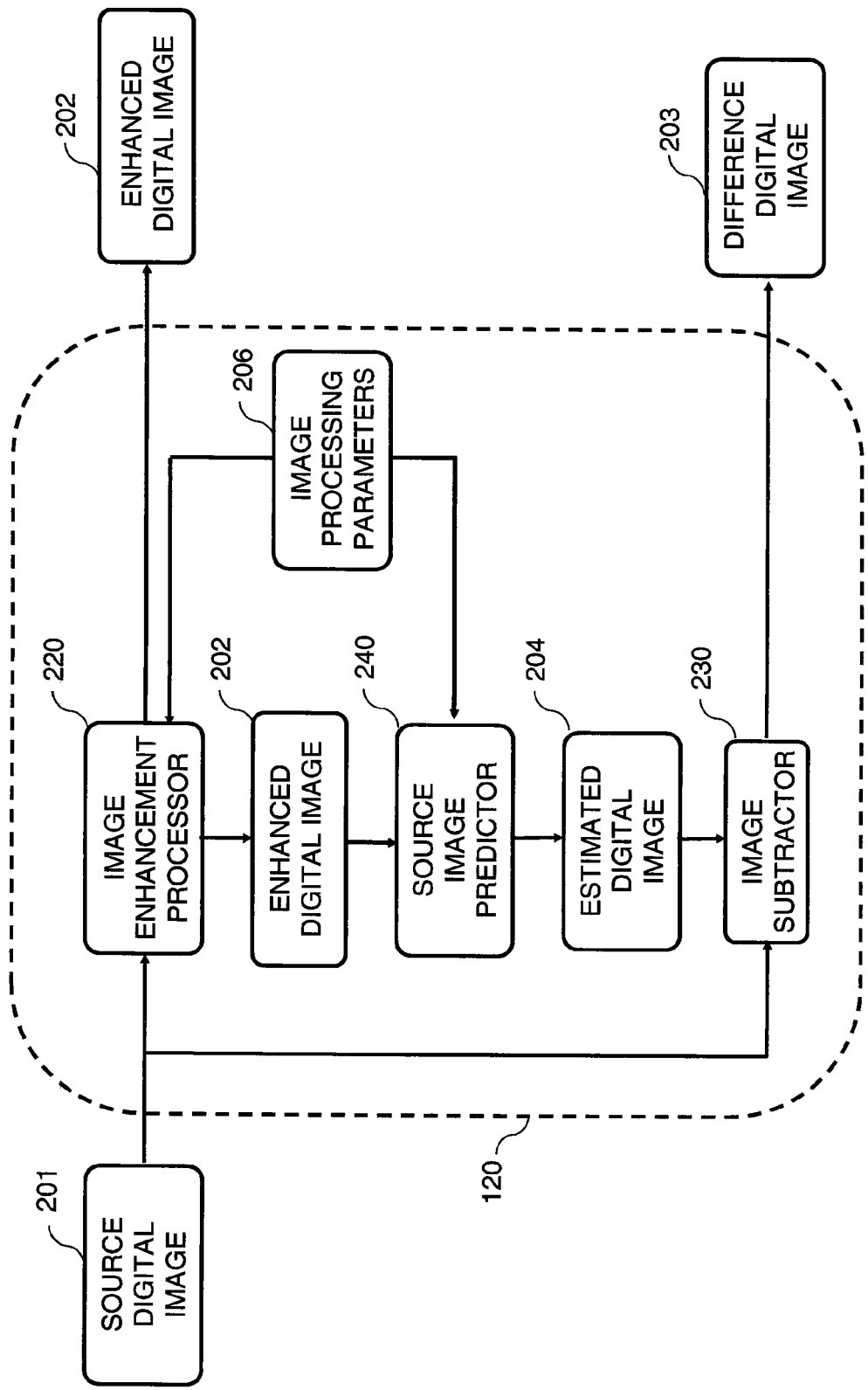
FIG. 3 is a block diagram showing the processing modules within an image processing computer.

FIG. 3 shows a block diagram illustrating the processing modules within an image processing computer. The details of the image processing steps performed by image processing computer 120 are now discussed with reference to FIG. 3. An image enhancement processor 220 receives source digital image 201. Image enhancement processor 200 applies a series of image processing operations (controlled by one or more image processing parameters 206) to the pixel data of source digital image 201. The result of these operations is enhanced digital image 202. Enhanced digital image 202 can be transmitted to another computer on communications network 110 (as shown in FIG. 2) and/or viewed on electronic display 180a (as shown in FIG. 2). Image enhancement processor 220 prepares the raw pixel data of source digital image 201 for optimal viewing and is therefore considered a digital image in a "rendered state" or a "rendered image", whereas source digital image 201 is in an "unrendered state".

Enhanced digital image 202 is further processed by a source image predictor 240 to generate an estimated digital image 204. The processing performed by source image predictor 240 approximates the image processing necessary to undo the effects of image enhancement processor 220. In other words, image enhancement processor 220 transforms the pixel data of source digital image 201 to form enhanced digital image 202. Source image predictor 240 transforms the pixel data back to approximately the original pixel values of source digital image 201. In general, estimated digital image 204 will be different than source digital image 201. This occurs since one or more of the applied image processing steps are not reversible.

An image subtractor 230 receives estimated digital image 204 and subtracts it from source digital image 201 to generate difference digital image 203.

Figure 4:
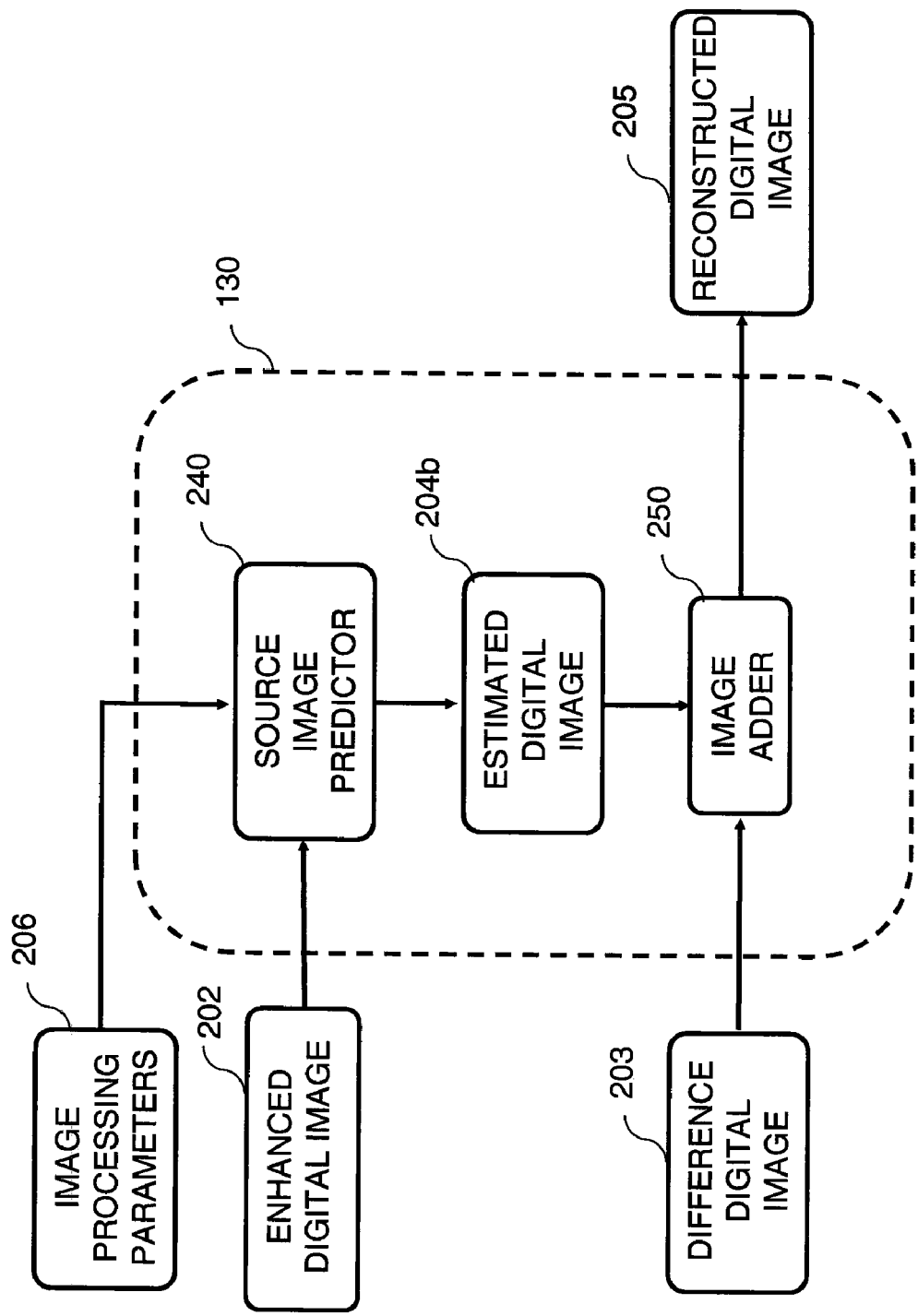
FIG. 4 is a block diagram showing the processing modules within a diagnostic workstation computer.

Referring now to FIG. 4, there is shown a block diagram of the processing modules within a diagnostic workstation computer to illustrate the details of the image processing steps performed by diagnostic workstation computer 130. The processing starts with source image predictor 240 receiving both enhanced digital image 202 and image processing parameters 206. Source image predictor 240 of diagnostic workstation computer 130 and image processing computer 120 (shown in FIG. 3) are the same. If not the same, then estimated digital image 204b produced within diagnostic workstation computer 130 will, in general, not be the same as corresponding estimated digital image 204 produced within image processing computer 130 (shown in FIG. 3). In this implementation, image processing parameters 206 are used to control source image predictor 240 to generate estimated digital image 204b. For example, image processing parameters 206 can include a parameter value relating to the magnitude of the spatial sharpening applied and different parameter value to indicate an applied tone scale function within a set of possible tone scale functions.

An image adder 250 additively combines estimated digital image 204b and difference digital image 203 to generate a reconstructed digital image 205.

Figure 5:
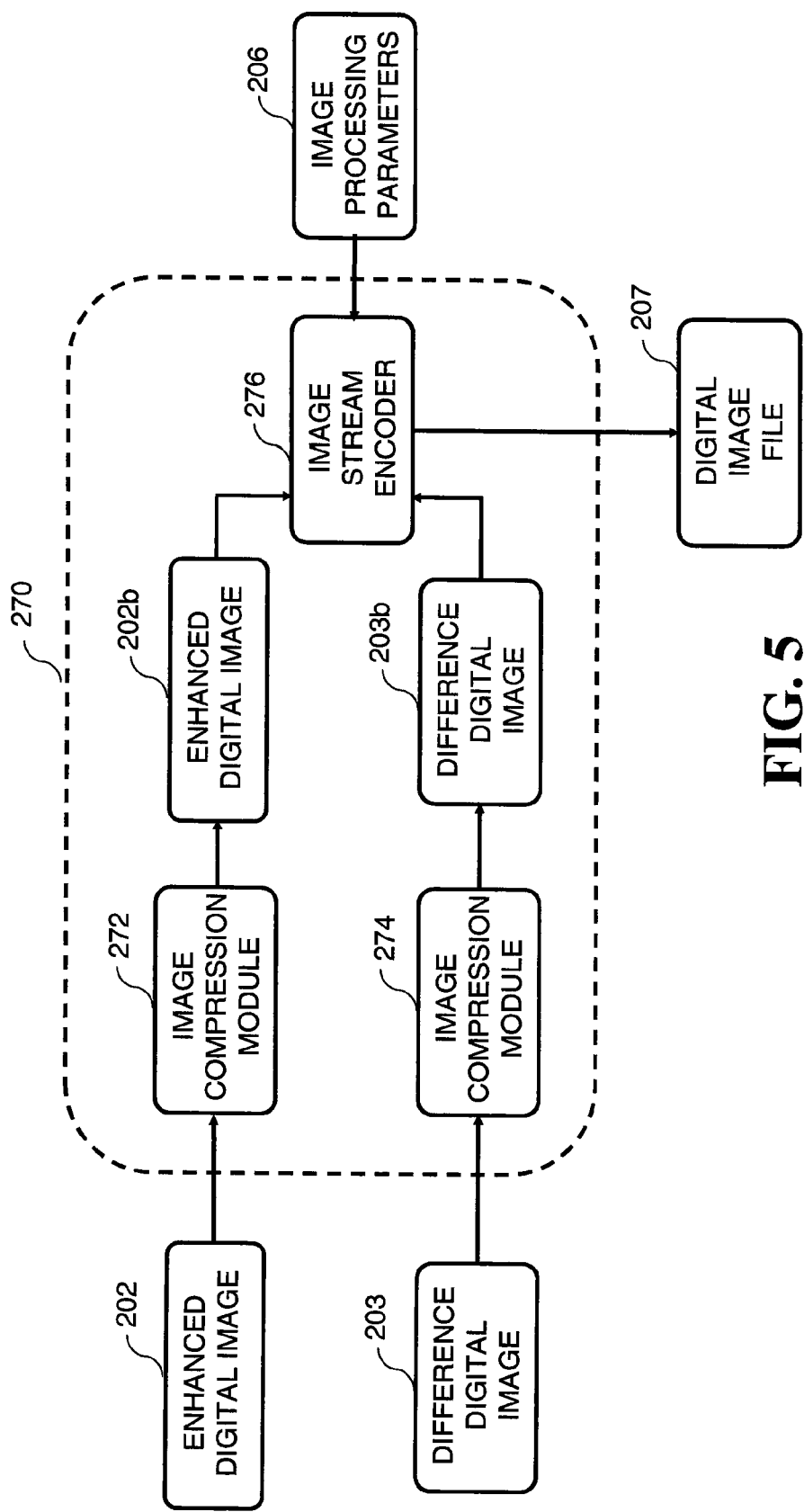
FIG. 5 is a block diagram showing the processing modules within an image encoding module.

It is noted that the flow of image information exchange as depicted by FIG. 2 shows enhanced digital image 202 and difference digital image 203 as being transmitted directly from image processing computer 120 to diagnostic workstation 130. While it is possible to transmit these digital images directly, in practice these two digital images are typically bundled together into a single image file or image stream by image processing computer 120. FIG. 5 shows the processing steps that can achieve the bundling operation within an image encoding module 270.

An image compression module 272 is optionally applied to enhanced digital image 202 resulting in an enhanced digital image 202b. Difference digital image 203 can be similarly processed by optional image compression module 274 to produce a difference digital image 203b. An image stream encoder 276 combines enhanced digital image 202b, difference digital image 203b, and image processing parameters 206 to produce a digital image file 207. A well-known image file format for medical applications is DICOM. Digital image file 207 includes both enhanced digital image 202b and difference digital image 203b. Incorporating difference digital image 203b in digital image file 207 is possible, as images often include other non-image information, e.g., information relating to patient 170 and image capture device 160.

A lossless image compression method can be applied (e.g., the Joint Photographic Experts Group (JPEG) lossless algorithm) to reduce the amount of memory required to store enhanced digital image 202 by creating enhanced digital image 202b without the loss of any information. If a lossy method is applied (e.g. JPEG 2000 lossy algorithm), there can be some mathematical information lost in compressing the image pixel data. Either lossless or lossy image compression can be applied to create a compressed difference digital image 203b from difference digital image 203. Both image compression modules 272 and 274 are preferably applied selectively and independently. That is, different image compression algorithms can be applied to enhanced digital image 202 and difference digital image 203, or the same image compression algorithm can be applied within both modules. In some situations, it can be desirable to apply an image compression algorithm to difference digital image 203 but not to enhanced digital image 202. Diagnostic workstations which are not enabled with the corresponding image decompression algorithm technology can interpret the image data of enhanced digital image 202 if no image compression has been applied.

Applicants believe that an advantage of the present invention over existing methods is that difference digital image 203 will generally be more compressible than enhanced digital image 202 since, for many images, the differences between the enhanced and source images will be small throughout large portions of the image. As a result, difference digital image 203 will typically be highly compressible using image compression algorithms, such as the well-known JPEG compression algorithm. Therefore, the amount of digital data that needs to be sent to diagnostic workstation computer 130 is typically less than would be required to send difference digital image 203 directly. This can result in faster transmission times across communications network 110, or smaller storage requirements on a removable computer readable storage medium.

Figure 6:
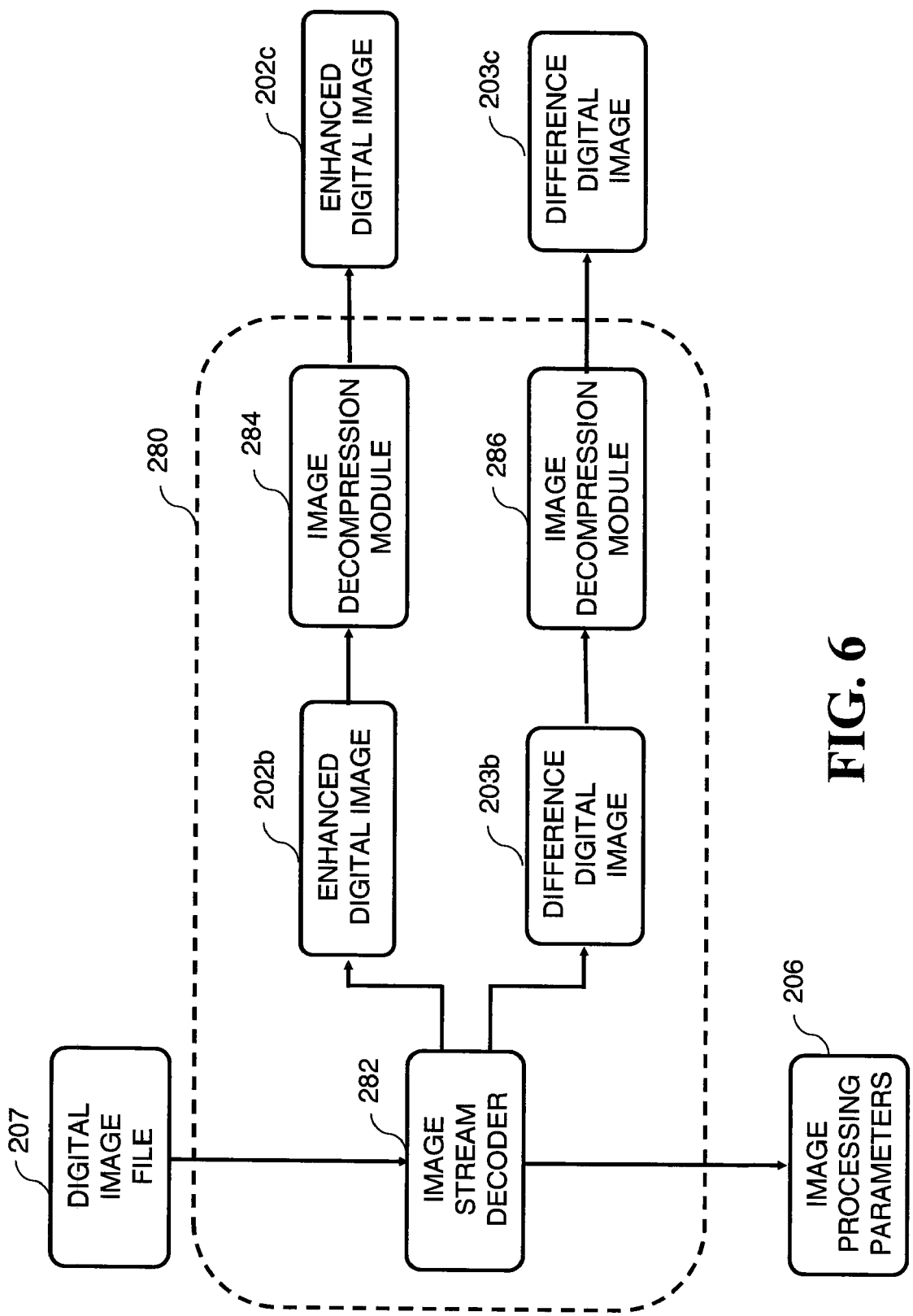
FIG. 6 is a block diagram showing the processing modules within an image decoding module.

FIG. 6 provides a block diagram showing the processing modules within an image decoding module 280 to illustrate the processing steps that can achieve the de-bundling operation within the image decoding module. An image stream decoder 282 receives digital image file 207 (shown in FIG. 5) and splits the information into enhanced digital image 202b, difference digital image 203b, and image processing parameters 206. An image decompression module 284 transforms enhanced digital image 202b into an enhanced digital image 202c by applying the image decompression algorithm corresponding to the image compression algorithm that was applied in the image compression module 272 (see FIG. 5). Similarly, an image decompression module 286 transforms difference digital image 203b into the difference digital image 203c by applying the image decompression algorithm corresponding to the image compression algorithm that was applied in image compression module 274 (see FIG. 5). It is reemphasized, the image data contained in enhanced digital images 202b and 202c will be identical only if no image compression algorithm had been applied or if a lossless image compression algorithm had been applied.

As was shown in FIG. 4, diagnostic workstation 130 generates reconstructed digital image 205 from input enhanced digital image 202 and difference digital image 203. As such, reconstructed digital image 205 will be identical to source digital image 201 (see FIGS. 2 and 3) only if no image compression algorithm had been applied or if a lossless image compression algorithm had been applied in image compression modules 272 and 274 (see FIG. 5). When a lossy compression algorithm has been applied, reconstructed digital image 205 will, in general, not be identical to source digital image 201 but will be substantially equivalent to source digital image 201.

The term "substantially equivalent" within the context of the present invention should be interpreted as "diagnostically equivalent". Lossy image compression algorithm technology (e.g. JPEG 2000), can be controlled in a manner such that little or no diagnostic information is lost as a result of the compression and decompression operations. With the present invention configured in such a manner (i.e. mild lossy compression), the diagnoses derived from viewing digital images having been processed with the above described lossy compression technology will be essentially the same as if no image compression had been performed.

Figure 7:
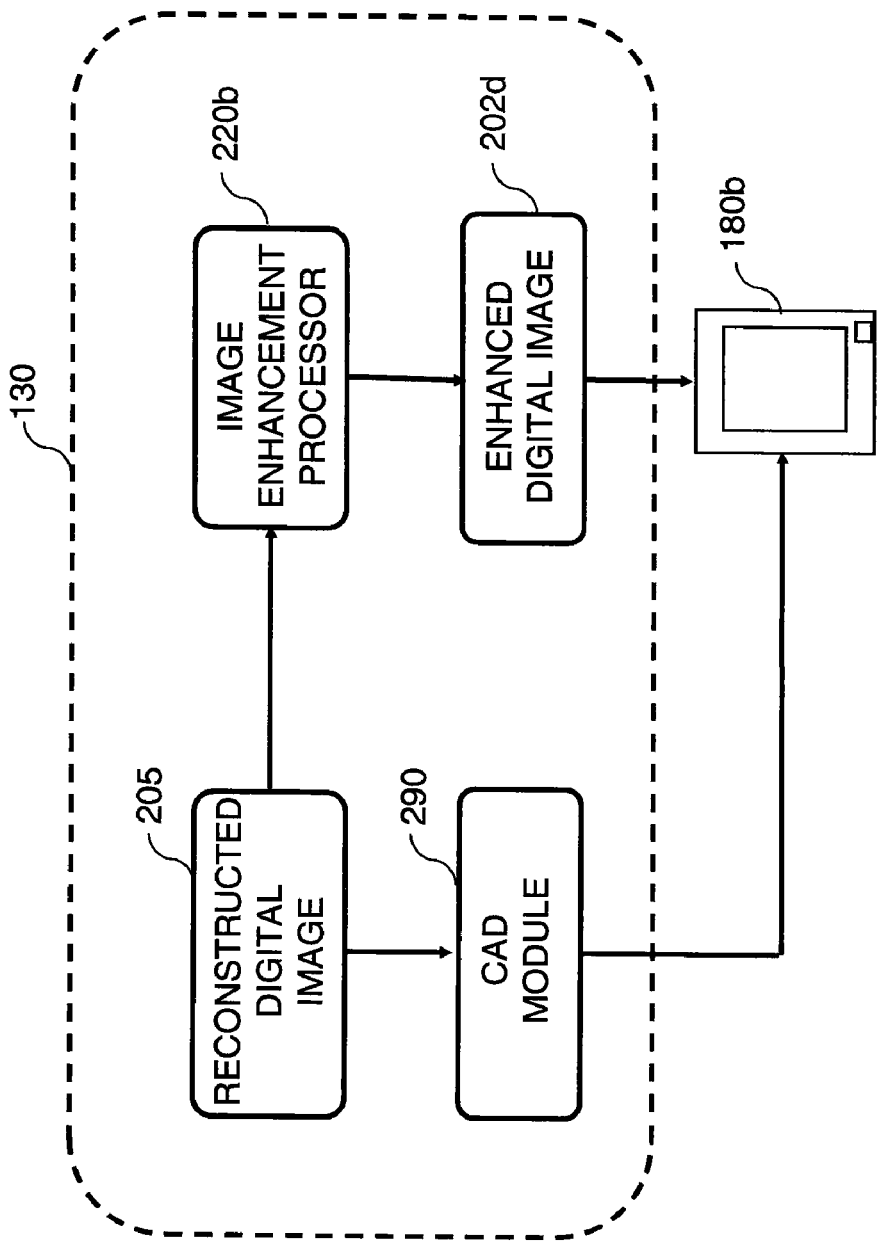
FIG. 7 is another block diagram showing the processing modules within a diagnostic workstation computer.

With the generation of reconstructed digital image 205, the operator of diagnostic workstation computer 130 can perform an operation that would normally be applied to source digital image 201. For example, FIG. 7 depicts reconstructed digital image 205 as being reprocessed by an image enhancement processor 220b to yield an enhanced digital image 202d displayed on the electronic display 180b. Image enhancement processor 220b can be different or the same as image enhancement processor 220 previously shown in FIG. 3. Consequently, enhanced digital image 202d will, in general, be different in appearance from the enhanced digital image 202 that was used to generate reconstructed digital image 205 (in FIG. 4). Alternatively, reconstructed digital image 205 can be used by a CAD module 290 (computer aided detection), which requires the pixel data in the form of the un-enhanced source digital image 201. An example of a computer aided detection algorithm is disclosed in U.S. Pat. No. 5,799,100 (Clarke).

Figure 8:
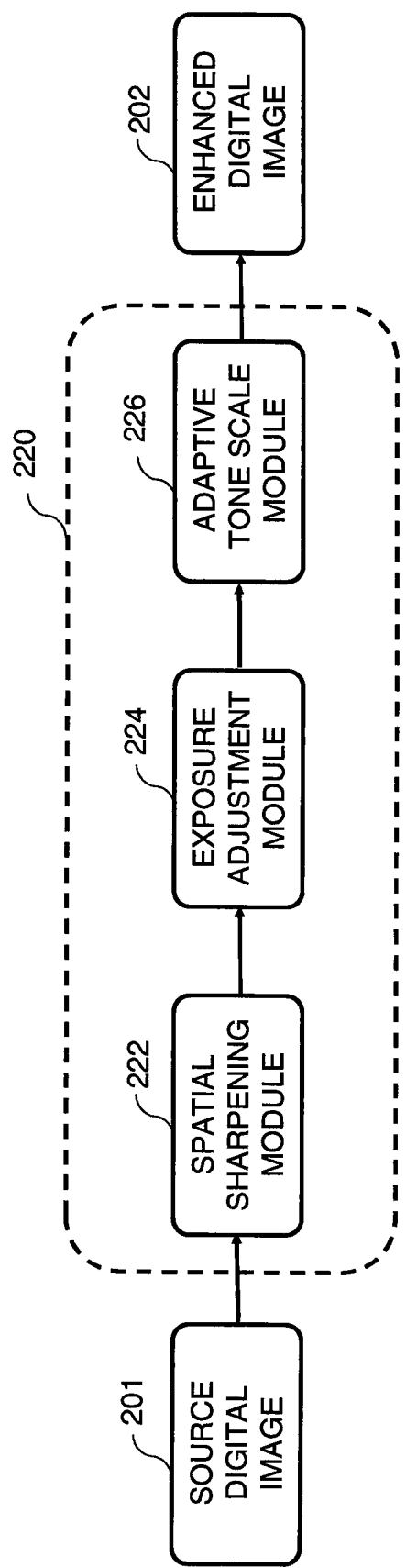
FIG. 8 is a block diagram showing the details of the image enhancement processor.

FIG. 8 more particularly describes image enhancement processor 220 previously shown in FIG. 3. Although the present invention can be practiced with different implementations of an image enhancement processor, a three element module of cascaded image processing modules is depicted in FIG. 8. Each image processing module receives an input digital image and generates an output digital image that is received by the next image processing module. Image enhancement processor 220 shown in FIG. 8 receives source digital image 201 and applies a succession of image processing modules 222, 224, and 226, to produce enhanced digital image 202.

Spatial sharpening module 222 decomposes an input digital image into multiple frequency sub-band images through the application of a spatial filter. These sub-band images are then amplified or de-amplified in order to change the sharpness appearance of enhanced digital image 202. The present invention can be practiced with various methods for spatial sharpening, such as disclosed in U.S. Pat. No. 6,069,979 (VanMetter), titled "Method for compressing the dynamic range of digital projection radiographic images"; and U.S. Pat. No. 6,351,571 (VanMetter), titled "Uniform convolution algorithm for frequency decomposition of image regions". The present invention can also be used with multi-resolution methods that alter the spatial characteristics of image pixel data, such as disclosed in U.S. Pat. No. 5,978,518 (Oliyide).

Exposure adjustment module 224 of FIG. 8 can be used to make enhanced digital image 202 lighter or darker. For log domain pixel data this operation can be accomplished by adding a numerical constant to each pixel value wherein the numerical constant represents the degree of lightness change desired. In a preferred embodiment, exposure adjustment module 224 is implemented as a manual interface wherein a user of the system can adjust enhanced digital image 202 to a desired lightness. It is also possible to incorporate an automatic lightness algorithm within exposure adjustment module 224. However, a preferred embodiment incorporates an automatic lightening operation within adaptive tone scale module 226.

Adaptive tone scale module 226 (shown in FIG. 8) is employed to transform an input digital image by applying a tone scale function, i.e. a single valued function that can be implemented in a look-up-table (LUT). The resulting output digital image will have a different lightness characteristic relationship relative to the input digital image when the image pixel data is view on an electronic display. That is, the lightness relationship of light and dark region, or contrast, within the digital image will be different after having had a tone scale function applied.

U.S. Pat. No. 5,541,028 (Lee) relates to a method of constructing a tone scale function for medical imaging applications such that equal log exposure differences in an x-ray digital image of an object produces substantially equal brightness differences in the transformed digital image when viewed on an electronic display. The present invention can be practiced with various methods of constructing tone scale function, such as described in U.S. Pat. No. 6,323,869 (Kohm) and U.S. Pat. No. 5,978,518 (Oliyide).

A preferred embodiment of the present invention employs an image processing method within image enhancement processor 220 (shown in FIG. 3), such as disclosed in U.S. Patent Application No. 2005/0018894 (Couwenhoven), filed Jul. 24, 2003, incorporated herein by reference. The image processing method described in Couwenhoven includes a multiple spatial frequency image processing algorithm that applies signal dependent spatial frequency manipulation and a tone-scale function to create enhanced digital image 202.

More particularly, source digital image 201, represented by the term I(i,j), is decomposed into four spatial frequency bands that are created by the application of three low pass spatial filters $K_0$, $K_1$ and $K_2$. Blurred digital images $I_0(i,j)$, $I_1(i,j)$ and $I_2(i,j)$ are created by convolving the input digital image I(i,j) with each respective low pass spatial filter. The spatial frequency band decomposition produces four spatial frequency band digital images $B_0(i,j)$, $B_1(i,j)$, $B_2(i,j)$ and $B_3(i,j)$ by manipulating the original and blurred digital images I(i,j), $I_0(i,j)$, $I_1(i,j)$ and $I_2(i,j)$. This process creates differences between filtered digital images as given by the following equations (1):

$$B_0(i,j)=I_0(i,j)$$

$$B_1(i,j)=I_1(i,j)-I_0(i,j)$$

$$B_2(i,j)=I_2(i,j)-I_1(i,j)$$

$$B_3(i,j)=I(i,j)-I_2(i,j). \quad (1)$$

Next, a spatially modified digital image is produced by constructing a weighted sum of the four spatial frequency digital images as given by the following equations (2) and (3):

$$I'(i,j)=B_0(i,j)+\gamma_1 B_1(i,j)+\gamma_2 B_2(i,j)+\gamma_3 B_3(i,j) \quad (2)$$

and $$\gamma_1=g_1(B_0(i,j))$$

$$\gamma_2=g_2(B_0(i,j))$$

$$\gamma_3=g_3(B_0(i,j)). \quad (3)$$

where the terms $g_1(B_0(i,j))$, $g_2(B_0(i,j))$, and $g_3(B_0(i,j))$, represents a scalar multipliers produced by evaluating the $g_1(\ )$, $g_2(\ )$, and $g_3(\ )$, functions at an input value given by the pixel value $B_0(i,j)$. The spatially modified digital image I'(i,j) is then transformed with the application of a tone scale function TS( ) to produce enhanced digital image 202 I"(i,j) as given by the following equation (4):

$$I''(i,j)=TS(I'(i,j)) \quad (4)$$

The functions $g_1(\ )$, $g_2(\ )$, $g_3(\ )$, TS( ) are point image processing operations implemented by means of a look-up-table (LUT) and are represented as image processing parameters 206 in FIGS. 3 and 4.

One aspect of the present invention is embodied in the function of source image predictor 240, shown in FIGS. 3 and 4. Enhanced digital image 202 produced by image enhancement processor 220 (shown in FIG. 3) has been spatially filtered with respect to source digital image 201. That is, the fine and course spatial detail present in the source digital image 201 has been modified to generate enhanced digital image 202. Consequently, a difference image—generated by subtracting enhanced digital image 202 from source digital image 201—would be highly modulated. That is, such a difference image would require a large amount of memory to faithfully record the spatial detail contained within. Source image predictor 240 employs an inverse spatial filter to approximate the spatial detail of source digital image 201 from enhanced digital image 202. A difference image formed from the inverse filtered version of enhanced digital image 202 is numerically closer in value to original source digital image 201. That is, difference digital image 203, shown in FIG. 3, requires less memory to faithfully record the spatial detail contained within.

A method of inverse spatial filtering has been tailored to, or matched to, a preferred method of spatial filtering described by equations (1) through (4) above. It is noted that, in general terms, spatial filtering can be defined by an operation of changing a pixel value based on the values of neighboring pixel values. Those skilled in the art will recognize that the present invention can be used with other particular methods of spatial filtering to achieve image enhancement and that an improved method of minimizing the memory required to represent difference digital image 203 would be an inverse spatial filtering method that is matched to the particular method of spatial filtering. Those skilled in the art will also recognize that an exact inverse spatial filtering method may not exist, however, approximate inverse spatial filtering methods can be constructed for any particular method of spatial filtering.

Figure 9:
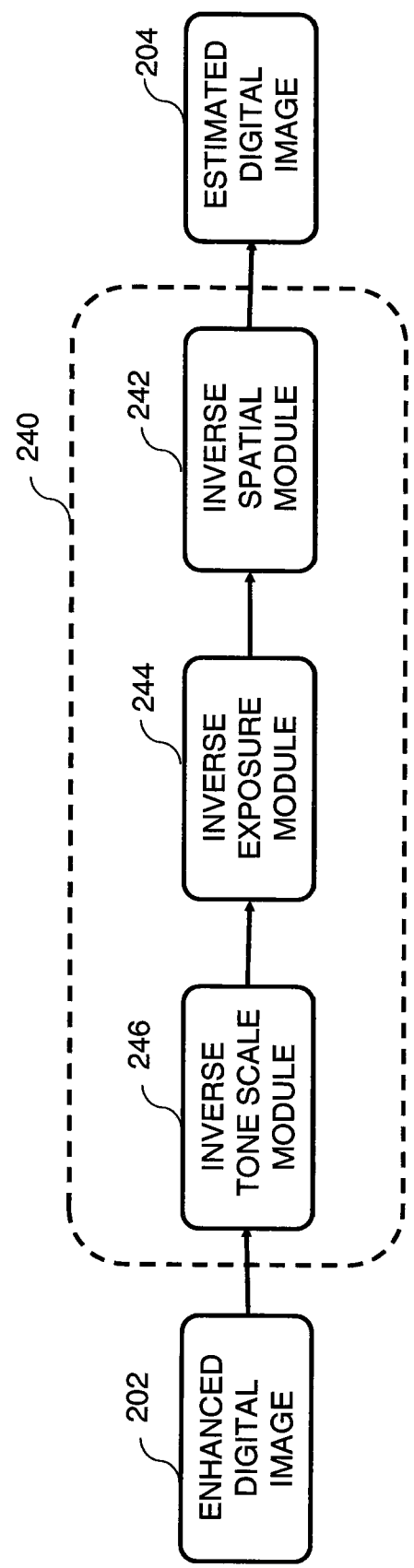
FIG. 9 is a block diagram showing the details of the inverse image enhancement processor.

As indicated above, the memory required to represent difference digital image 203 is minimized by producing estimated digital image 204 that is numerically close to original digital image 201. This operation is achieved by source image predictor 240 shown in FIGS. 3 and 4, and which is now described in more detail with reference to FIG. 9.

The image processing steps of source image predictor 240 are a cascade of image processing modules that are designed to successively invert the image processing steps that were applied with image enhancement processor 220. However, the image processing modules applied within source image predictor 240 are applied in reverse order with respect to the order of the image processing modules applied within image enhancement processor 220. Therefore, for the generic example of image enhancement processor 220 shown in FIG. 8, the corresponding source image predictor 240 applies an inverse tone scale module 246, followed by an inverse exposure module 244, followed by an inverse spatial module 242. The result of the cascaded set of image processing modules is estimated digital image 204.

The image processing steps employed to invert the above described image enhancement implementation of Couwenhoven starts with inverse tone scale module 246. The effects of the applied tone scale function TS( ) is first removed by applying an inverse tone scale function given by $TS^{-1}( )$ as given by the following equation (5):

$$J'(i,j)=TS^{-1}(I''(i,j)) \tag{5}$$

The term $J'(i,j)$ represents an estimation of the spatially modified digital image $I'(i,j)$ described above. If the tone scale function TS( ) is monotonic, the inverse tone scale function $T^{-1}( )$ will also be monotonic and $J'(i,j)$ can be identical to $I'(i,j)$. However, if TS( ) is not monotonic, the function $TS^{-1}( )$ will yield an approximate inversion and the resulting digital image $J'(i,j)$ may not be identical to $I'(i,j)$.

There are a variety of methods that can be used to calculate an inverse tone scale function. One method of calculating an inverse function involves iterating over function values. For example, to determine the function $TS^{-1}(y)$ for an input value y, the function TS( ) is examined to find all of the function values TS(x) that yield a value y (or values closest in value to y). If multiple values of x are found and average x value can be calculated that forms the value of $TS^{-1}(y)$. This process is iteratively solved for all other domain values of y that are of interest.

The difference between $J'(i,j)$ and $I'(i,j)$ may be zero, but in general, the difference can be represented as $DTS(i,j)$, given by the following equation (6):

$$\Delta TS(i,j)=I'(i,j)-J'(i,j) \tag{6}$$

The difference, $\Delta TS(i,j)$, may be stored as part of difference digital image 203 and used to recover $I'(i,j)$ from $J'(i,j)$ by recalculating $I'(i,j)$ as given by the following equation (7):

$$I'(i,j)=J'(i,j)+\Delta TS(i,j) \tag{7}$$

The next step in the inverse processing performed by source image predictor 240 is the application of inverse spatial module 242.

In the following description of inverse spatial frequency processing, the term $M'(i,j)$ will be used symbolically to represent $J'(i,j)$, for the case that the term $\Delta TS(i,j)$ was not used, and $I'(i,j)$ for the case when the term $\Delta TS(i,j)$ was used. The digital image $M'(i,j)$ is decomposed into four spatial frequency digital images. Each of the spatial frequency digital images approximates one of the terms of the modified frequency digital image as described in equation (2).

In similar fashion to the image processing steps originally applied to $I(i,j)$, the three low pass filters $K_0$, $K_1$ and $K_2$ are applied to $M'(i,j)$. Blurred images $M'_0(i,j)$, $M'_1(i,j)$ and $M'_2(i,j)$ result from the convolution of input image $M'(i,j)$ with respective low pass filters $K_0$, $K_1$ and $K_2$. The spatial frequency decomposition is completed to produce four approximate spatial frequency digital images $A_0(i,j)$, $A_1(i,j)$, $A_2(i,j)$ and $A_3(i,j)$ from the images $M'(i,j)$, $M'_0(i,j)$, $M'_1(i,j)$ and $M'_2(i,j)$ as given by the following equations (8):

$$A_0(i,j)=M'_0(i,j)$$

$$A_1(i,j)=M'_1(i,j)-M'_0(i,j)$$

$$A_2(i,j)=M'_2(i,j)-M'_1(i,j)$$

$$A_3(i,j)=M'(i,j)-M'_2(i,j) \tag{8}$$

Digital image $A_0(i,j)$ is an approximation of $B_0(i,j)$ and can be used with $A_1(i,j)$, $A_2(i,j)$ and $A_3(i,j)$, and knowledge of functions $g_1( )$, $g_2( )$ and $g_3( )$, to approximate $I(i,j)$ as given by the following equations (9):

$$J(i,j)=A_0(i,j)+A_1(i,j)/(g_1(A_0(i,j)))+A_2(i,j)/(g_2(A_0(i,j)))+A_3(i,j)/(g_3(A_0(i,j))) \tag{9}$$

where $J(i,j)$ represents estimated digital image 204 shown in FIG. 3. The terms $g_1$, $g_2$, and $g_3$ represent part of the image processing parameters 206 in FIG. 3. The difference between $J(i,j)$ and source digital image 201 $I(i,j)$, shown as the operation of image subtractor 230, is represented as difference digital image 203 $\Delta(i,j)$ by the following equation (10):

$$\Delta(i,j)=I(i,j)-J(i,j) \tag{10}$$

As described above, the combination of enhanced digital image 202 $I''(i,j)$ and difference digital image 203 $\Delta(i,j)$ is used to generate reconstructed digital image 205 as shown in FIG. 4. Source image predictor 240 produces estimated digital image 204b, also represented as $J(i,j)$. Image adder 250 (FIG. 4) generates reconstructed digital image 205 $H(i,j)$ from $J(i,j)$ and $\Delta(i,j)$ through the application of the equation (11) as shown in FIG. 4:

$$H(i,j)=J(i,j)+\Delta(i,j) \tag{11}$$

Therefore, enhanced digital image 202 $I''(i,j)$ can be used with knowledge of low pass filters $K_0$, $K_1$ and $K_2$, the tone scale function TS( ), the scaling functions $g_1( )$, $g_2( )$, $g_3( )$, and difference digital image 203 $\Delta(i,j)$ to fully recover source digital image 201 $I(i,j)$. That is, when $\Delta(i,j)$ is generated with $M'(i,j)$ representing $J'(i,j)$. Alternatively, $I''(i,j)$ can be exactly recovered with the additional knowledge of $\Delta TS(i,j)$ as given by (6) when $\Delta(i,j)$ is created with $M'(i,j)$ representing $I'(i,j)$.

Application of the inversion processing may be advantaged by application of data and image compression technologies. Compression can reduce the amount of computer memory, data recording media and reduce transmission times for image data over communication channels. A person skilled in the art will recognize the many options for applying lossless or lossy compression algorithms to data at each stage of processing to create or store the difference images. Application of compression, including lossy compression may still result in exact, lossless recovery of the original image $I(i,j)$. For example, when both $\Delta TS(i,j)$ and $\Delta(i,j)$ are used, a lossy compression could be applied to the image $\Delta TS(i,j)$. Provided that subsequent calculations in the creation of $\Delta(i,j)$ use the compressed and then expanded $\Delta TS(i,j)$ the image inversion processing can still create an exact reproduction of the input image I(i,j). In other applications of inverse image processing, lossy compression may provide an approximation input image I(i,j). For example, lossy compression of Δ(i,j) or even complete loss of Δ(i,j) would allow for recovery of an approximation of the input image I(i,j).

The present invention can be implemented in a combination of computer hardware software as shown in FIG. 2 within image processing computer 120 and diagnostic workstation computer 130. It is also possible to implement the present invention within the image capture device 160 shown in FIG. 1. Although this is the preferred embodiment of the present invention, the technology can be implemented on any imaging capable computer.

The image processing operations depicted in the figures and described herein can be implemented and stored as a computer program stored in a computer readable storage medium. The computer readable storage medium may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program. It is also possible to embed a software implementation of the present invention on an electronic circuit.

It should also be noted that the present invention implemented in a combination of software and/or hardware is not limited to devices that are physically connected and/or located within the same physical location. For example, one or more of the devices illustrated in FIG. 3 may be located remotely and may be connected via a wireless connection.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for processing a source digital image, comprising using a processor or computer to perform steps of:
    accessing the source digital image comprised of a plurality of pixels;
    applying a spatial filter to the source digital image to produce an enhanced digital image, wherein the spatial filter changes pixel values of the source digital image based on neighboring pixel values in the source digital image;
    applying an inverse spatial filter to the enhanced digital image to produce an estimated digital image, wherein the inverse spatial filter changes pixel values of the enhanced digital image based on neighboring pixel values in the enhanced digital image, the inverse spatial filter being matched to the spatial filter; and
    producing a difference digital image from the estimated digital image and the source digital image, the difference digital image being representative of a difference between the source digital image and the estimated digital image.

2. The method of claim 1 further comprising the steps of:
    transmitting the difference digital image and the enhanced digital image from a first device to a second device remote from the first device; and
    generating a reconstructed digital image from the difference digital image and the enhanced digital image at the second device, the reconstructed digital image being substantially equivalent to the source digital image.

3. The method of claim 2 further comprising the steps of:
    identifying a set of image processing parameters employed in the application of the spatial filter;
    transmitting the set of image processing parameters from the first device to the second device; and
    using the set of image processing parameters to generate the reconstructed digital image.

4. The method of claim 2 wherein the difference digital image and the enhanced digital image are transmitted by means of a communications network.

5. The method of claim 2 further comprising the steps of:
    compressing the difference digital image at the first device prior to the step of transmitting; and
    uncompressing the difference digital image at the second device prior to the step of generating the reconstructed digital image.

6. The method of claim 5 further comprising the step of transmitting the enhanced digital image without data compression.

7. An apparatus adapted to process a source digital image, comprising:
    means for accessing the source digital image comprised of a plurality of pixels;
    means for applying a spatial filter to the source digital image to produce an enhanced digital image, wherein the spatial filter changes pixel values of the source digital image based on neighboring pixel values in the source digital image;
    means for applying an inverse spatial filter to the enhanced digital image to produce an estimated digital image, wherein the inverse spatial filter changes pixel values of the enhanced digital image based on neighboring pixel values in the enhanced digital image, the inverse spatial filter being matched to the spatial filter; and
    means for producing a difference digital image from the estimated digital image and the source digital image, the difference digital image being representative of a difference between the source digital image and the estimated digital image.

8. A method for processing a source digital image, comprising using a processor or computer to perform steps of:
    accessing the source digital image comprised of a plurality of pixels;
    applying an image enhancement processor to the source digital image to produce an enhanced digital image, the image enhancement processor including application of a spatial filtering operation, wherein the spatial filtering operation changes pixel values of the source digital image based on neighboring pixel values in the source digital image;
    applying an inverse processor to the enhanced digital image to produce an estimated digital image, the inverse processor including application of an inverse spatial filtering operation, wherein the inverse spatial filtering operation changes pixel values of the enhanced digital image based on neighboring pixel values in the enhanced digital image, the inverse spatial filtering operation being matched to the spatial filtering operation; and
    producing a difference digital image from the estimated digital image and the source digital image, the difference representing the difference between the source digital image and the estimated digital image.

9. The method of claim 8 further comprising the steps of:
transmitting the difference digital image and the enhanced digital image from a first device to a second device remote from the first device; and
generating a reconstructed digital image from the difference digital image and the enhanced digital image at the second device, the reconstructed digital image being substantially equivalent to the source digital image.

10. The method of claim 9 further comprising the steps of:
identifying a set of image processing parameters employed by the image enhancement processor;
transmitting the set of image processing parameters from the first device to the second device; and
using the set of image processing parameters to generate the reconstructed digital image.

11. The method of claim 9 wherein the difference digital image and the enhanced digital image are transmitted by means of a communications network.

12. The method of claim 9 further comprising the steps of:
compressing the difference digital image at the first device prior to the step of transmitting; and
uncompressing the difference digital image at the second device prior to the step of generating the reconstructed digital image.

13. The method of claim 9 further comprising the steps of:
transmitting the enhanced digital image without data compression,
compressing the difference digital image at the first device prior to the step of transmitting; and
uncompressing the difference digital image at the second device prior to the step of generating the reconstructed digital image.

14. The method of claim 8 wherein the step of applying an image enhancement processor further comprises the steps of:
applying an exposure adjustment operation to the source digital image; and
applying a tone scale adjustment operation to the source image.

15. A method for processing a source digital image, comprising using a processor or computer to perform steps of:
accessing the source digital image comprised of a plurality of pixels;
applying an image enhancement processor to the source digital image to produce an enhanced digital image, the application comprising the steps of: (a) applying a spatial filter, (b) applying exposure adjustment, and (c) applying a tone scale function;
applying an inverse processor to the enhanced digital image to produce an estimated digital image, the application comprising the steps of: (a) applying an inverse tone scale function, (b) applying an inverse exposure adjustment, and (c) applying an inverse spatial filter wherein the inverse spatial filter is matched to the spatial filter; and
producing a difference digital image from the estimated digital image and the source digital image, the difference representing the difference between the source digital image and the estimated digital image.

16. The method of claim 15 further comprising the steps of:
transmitting the difference digital image and the enhanced digital image from a first device to a second device remote from the first device; and
generating a reconstructed digital image from the difference digital image and the enhanced digital image at the second device, the reconstructed digital image being substantially equivalent to the source digital image.

17. The method of claim 16 further comprising the steps of:
identifying a set of image processing parameters employed by the image enhancement processor;
transmitting the set of image processing parameters from the first device to the second device; and
using the set of image processing parameters to generate the reconstructed digital image.

18. The method of claim 16 further comprising the steps of:
compressing the difference digital image at the first device prior to the step of transmitting; and
uncompressing the difference digital image at the second device prior to the step of generating the reconstructed digital image.

19. The method of claim 16 further comprising the steps of:
transmitting the enhanced digital image without data compression,
compressing the difference digital image at the first device prior to the step of transmitting; and
uncompressing the difference digital image at the second device prior to the step of generating the reconstructed digital image.

20. A method for processing a source digital image, comprising using a processor or computer to perform steps of:
accessing the source digital image comprised of a plurality of pixels;
applying an image enhancement processor to the source digital image to produce an enhanced digital image, the image enhancement processor including application of a spatial filtering operation;
applying an inverse processor to the enhanced digital image to produce an estimated digital image, the inverse processor including application of (a) an inverse spatial filtering operation, the inverse spatial filtering operation being matched to the spatial filtering operation, (b) an inverse exposure adjustment operation, and (c) an inverse tone scale adjustment; and
producing a difference digital image from the estimated digital image and the source digital image, the difference representing the difference between the source digital image and the estimated digital image.

* * * * *